United States Patent
Tangager (10) Patent No.: US 11,359,599 B2
(45) Date of Patent: Jun. 14, 2022

(54) METHOD FOR REINFORCING A WIND TURBINE BLADE

(71) Applicant: BLADE REPAIR SOLUTIONS APS, Frederujshavn (DK)

(72) Inventor: Kim Tangager, Hadsund (DK)

( * ) Notice: Subject to any disclaimer, the term of this patent is extended or adjusted under 35 U.S.C. 154(b) by 11 days.

(21) Appl. No.: 16/643,974

(22) PCT Filed: Aug. 28, 2018

(86) PCT No.: PCT/DK2018/050210
§ 371 (c)(1),
(2) Date: Mar. 3, 2020

(87) PCT Pub. No.: WO2019/048014
PCT Pub. Date: Mar. 14, 2019

(65) Prior Publication Data
US 2021/0062784 A1 Mar. 4, 2021

(30) Foreign Application Priority Data
Aug. 28, 2018 (DK) .............................. PA201700486

(51) Int. Cl.
*B23P 15/04* (2006.01)
*F03D 1/06* (2006.01)
*F03D 13/10* (2016.01)

(52) U.S. Cl.
CPC ........... *F03D 1/0675* (2013.01); *F03D 13/10* (2016.05); *F05B 2230/21* (2013.01);
(Continued)

(58) Field of Classification Search
CPC ........ F03D 1/0675; F03D 13/10; F03D 80/50; F03D 1/06; F03D 1/0633; F03D 1/0683;
(Continued)

(56) References Cited

U.S. PATENT DOCUMENTS

| 2014/0186188 A1 | 7/2014 | Takeuchi |
| 2015/0151458 A1* | 6/2015 | Loftus, Jr. ............... B29C 33/38 156/499 |

(Continued)

FOREIGN PATENT DOCUMENTS

| EP | 3144525 A1 | 3/2017 |
| WO | WO2014/170332 A1 | 10/2014 |
| WO | WO2016/189278 A1 | 12/2016 |

OTHER PUBLICATIONS

International Search Report and Written Opinion for PCT Patent App. No. PCT/DK2018/050210 (dated Dec. 19, 2018).

*Primary Examiner* — Jun S Yoo
(74) *Attorney, Agent, or Firm* — Cermak Nakajima & McGowan LLP; Malcolm K. McGowan (57) ABSTRACT

The invention relates to a method for reinforcing a part of the outer surface of a wind turbine blade, said method comprises the steps: i) providing a blade plug having an outer surface resembling the topography of the outer surface of at least a leading portion of at least part of the length of a wind turbine blade; ii) casting a mold of part of the blade plug obtained in step i) in such a way that the topography of an inner surface of said mold corresponds to the topography of part of an outer surface of said blade plug provided in step i); iii) from the mold obtained in step ii), preparing a protective shell by making a casting of the inner surface of said mold; said protective shell is comprising an inner surface and an outer surface, said protective shell is being (Continued)

made from one or more predetermined materials; iv) starting from the topography of the surface of the wind turbine blade; or starting from a blade plug as obtained in step i) preparing an enlarged plug; said enlarged plug thereby comprising an outer surface resembling the topography of the outer surface of at least a leading part of said wind turbine blade; said outer surface of said enlarged plug is having larger dimensions than said outer surface of said blade plug; v) from the enlarged plug obtained in step iv), casting a mounting shell having an inner surface and an outer surface, in such a way that the topography of at least part of an inner surface of said mounting shell corresponds to the topography of part of an outer surface of said enlarged plug; vi) applying an adhesive to at least part of the inner surface of said protective shell and/or to at least part of the outer surface of at least a leading portion of said outer surface of said wind turbine blade; vii) fitting the inner surface of said protective shell onto at least a leading portion of the outer surface of said wind turbine blade; viii) fitting the inner surface of said mounting shell onto said outer surface of said protective shell; ix) applying a force to said mounting shell, and thereby also to said outer surface of said protective shell;

wherein said force comprises a force component in a cord direction from the leading surface to the trailing surface of said wind turbine blade; wherein said force additionally comprises a force component in a direction perpendicular to the cord direction and perpendicular to the lengthwise direction of said wind turbine blade; thereby pressing said mounting shell and said protective shell against the outer surface of the wind turbine blade; x) allowing said adhesive applied in step vi) to cure, and subsequently removing said mounting shell from said wind turbine blade and from said protective shell.

23 Claims, 6 Drawing Sheets

(52) U.S. Cl.
CPC ....... *F05B 2230/23* (2013.01); *F05B 2230/40* (2013.01); *F05B 2230/61* (2013.01); *F05B 2240/303* (2020.08); *F05B 2280/6003* (2013.01)

(58) Field of Classification Search
CPC ............ F05B 2240/303; F05B 2230/21; F05B 2230/23; F05B 2230/40; F05B 2230/61; F05B 2280/6003; F05B 2230/80; Y02P 70/50; Y02E 10/72
See application file for complete search history.

(56) References Cited

U.S. PATENT DOCUMENTS

| | | |
|---|---|---|
| 2016/0215757 A1* | 7/2016 | Behmer .............. B29C 70/0035 |
| 2017/0314532 A1* | 11/2017 | Kirkegaard ........ C08G 18/7671 |
| 2020/0116028 A1* | 4/2020 | Kray ..................... F04D 29/324 |
| 2021/0062784 A1* | 3/2021 | Tangager ................ F03D 13/10 |
| 2021/0215140 A1* | 7/2021 | Kratmann ............... F03D 80/00 |

* cited by examiner

METHOD FOR REINFORCING A WIND TURBINE BLADE

CROSS-REFERENCE TO RELATED APPLICATIONS

This application is a National Stage Entry of PCT/DK2018/050210, filed 28 Aug. 2018, which claims priority from Danish patent applications PA 2017 00486, filed 6 Sep. 2017. The contents of these priority applications are incorporated herein by reference in their entirety.

FIELD OF THE INVENTION

The present invention generally relates to the field of wind turbines. More specifically, the present invention in a first aspect relates to a method for reinforcing a part of the outer surface of a wind turbine blade.

In a second aspect the present invention relates to a method for reducing the frequency and/or duration of non-operative time of a wind turbine.

In a third aspect the present invention the present invention relates to a kit of parts comprising a protective shell and a mounting shell for use in a method for reinforcing a wind turbine blade.

In a fourth aspect the present invention relates to a protective shell per se as defined in respect of the third aspect.

In a fifth aspect the present invention relates to a mounting shell per se as defined in respect of the third aspect.

BACKGROUND OF THE INVENTION

Within the latest decades wind energy have gained increasingly usage as a source of renewable energy and a tremendous number of wind turbines have been manufactured and erected on-shore as well as off-shore.

A wind turbine in it most predominant form which is of the horizontal rotor type comprises a wind turbine tower anchored in the ground or in the seabed in a foundation. A nacelle is pivotally arranged in the opposite upper end of the tower. The nacelle itself carries the rotor comprising typically three rotor blades arranged at a hub on a rotor axle. The nacelle also comprises an electric generator for converting torque of the rotor axle, picked up by the blades from the wind and transformed into rotation, into electric power.

The development within the field of wind turbine technology has for many years tended to move in the direction of designing wind turbines having ever increasing sizes, including the size of the wind turbine blades. At the moment wind turbine blades having a length exceeding 80 m is not uncommon.

In such wind turbines it is not uncommon that the tips of the wind turbine blades encounter velocities as high as around 100 m/s.

As the air blowing through the rotor plane of a wind turbine rotor may comprises various types of solid and liquid debris, such as sand, dust, insects, hail, ice, water and snow, the impact of such debris with the wind turbine blade will have a detrimental effect of the structural integrity of the blade, at least at the tip part of the blade which encounters the highest angular velocity, thereby leading to destruction and removal of the outer coating layer(s) and even delaminating of the composite material from which the wind turbine blade is manufactured. Such effects will initially have a detrimental effect on the aerodynamic properties of the wind turbine blade, thus reducing the power of the wind turbine and will eventually also have the consequence that the structural integrity of the wind turbine blade will be reduced to the extent that there is a risk that the wind turbine blade will disintegrate and come apart.

In order to alleviate the detrimental effects of impact with debris encountered by a wind turbine blade, it has been customary to take down the wind turbine blades, and—by working on the ground—rebuilt the blades by applying new composite material, if necessary, and to apply new outer coatings covering the laminate material of the blade.

An alternative solution has been put on the marked by 3M® marketing a protective polyurethane tape which may applied on the surface of a wind turbine blade. The tape is supplied in reels and is simply adhered to the leading edge and the immediate areas behind the leading edge at the low pressure side and the high pressure side of the blade.

This solution however requires that the surface of the wind turbine blade, in the area of application, is free of surface defects. Therefore, this solution is only applicable to new wind turbine blades which has not been in operation or used wind turbine blades which have had their outer surface regenerated.

Although this solution will provide improved protection for some time, this solution provided by 3M® suffers from the problem that over time the protective tape loses adherence and starts to come off the blade.

Another method which involves mounting a front cover on a leading portion of a wind turbine blade is disclosed in WO 2004/076852 A2. This document discloses a method for the manufacture a wind turbine blade. The method involves formation of two shell parts from which the wind turbine subsequently is formed by assembly thereof. Subsequently, and in order to avoid labor heavy sanding operations, a front cover is glued onto the leading portion of the assembled parts at the junction line of the two shell parts. The front cover of this document serves the purpose of making the production of a new wind turbine blade more efficient by avoiding sanding of the area of junction of the two shell parts.

WO 2004/076852 A2 does not disclose that the front cover is being manufactured in a way representing a copy of the outer geometry of the blade. In contrast, in the method of WO 2004/076852 A2 it is considered advantageous that the front cover does not make a close fit with the surface of the blade as it is preferred that upon fixing the front cover onto the surface of the blade, a void between the front cover and the front surface of the wind turbine blade will be established which will be filled with filler and glue. The front cover disclosed in WO 2004/076852 A2 is not intended for use as a protective cover for protecting against erosion of the surface of the wind turbine blade and the front cover disclosed herein is not intended for repairing a wind turbine blade which has encountered surface defects during operation thereof.

The present inventor has in his previous patent application DK 2015 70881 A1 proposed a yet alternative solution with the problem of blade tip defects caused by debris. This solution relates to preparing a mold having an outer surface topography which corresponds to the surface topography of the actual blade which is to be protected. From that mold is cast from a composite material a composite cover which due to the mode of manufacture will have an inner surface topography which corresponds to the outer surface topography of the area of the wind turbine blade which is to be protected.

Once manufactured from the mold, the composite cover is being glued to the outer surface at a leading portion of the blade.

Although this solution has proven to provide a highly enhanced surface strength at a leading portion of a wind turbine blade, the composite cover suffers from certain disadvantages.

These disadvantages relate to the fact that upon gluing the composite cover onto the leading portion of the wind turbine blade it cannot be fully ensured that no inclusion of air pockets will be present between the outer surface of the blade and the composite cover.

In case of presence of such air pockets the resulting wind turbine blade will in a situation where a lightning strikes the blade be prone to explosive disintegration due to the resulting rapid rise in temperature of such air.

Moreover, the method disclosed in DK 2015 70881 A1 requires that any surface defects at the area of positioning of the composite cover will have to be repaired prior to the mounting thereof. Such repairs add labor and cost to the process.

Accordingly, problems persist in relation to avoiding surface defects of a leading portion of a wind turbine blade, caused by impacting debris present in the air.

It is an objective of the present invention to alleviate or even to eliminate such problems.

BRIEF DESCRIPTION OF THE INVENTION

This objective is achieved by the present invention in its first, second, third, fourth and fifth aspect, respectively.

Accordingly, the present invention relates in a first aspect to a method for reinforcing a part of the outer surface of a wind turbine blade, said method comprises the steps:

i) providing a blade plug having an outer surface resembling the topography of the outer surface of at least a leading portion of at least part of the length of a wind turbine blade;

ii) casting a mold of part of the blade plug obtained in step i) in such a way that the topography of an inner surface of said mold corresponds to the topography of part of an outer surface of said blade plug provided in step i);

iii) from the mold obtained in step ii), preparing a protective shell by making a casting of the inner surface of said mold; said protective shell is comprising an inner surface and an outer surface, said protective shell is being made from one or more predetermined materials;

iv) starting from the topography of the surface of the wind turbine blade; or starting from a blade plug as obtained in step i) preparing an enlarged plug; said enlarged plug thereby comprising an outer surface resembling the topography of the outer surface of at least a leading part of said wind turbine blade; said outer surface of said enlarged plug is having larger dimensions than said outer surface of said blade plug;

v) from the enlarged plug obtained in step iv), casting a mounting shell having an inner surface and an outer surface, in such a way that the topography of at least part of an inner surface of said mounting shell corresponds to the topography of part of an outer surface of said enlarged plug;

vi) applying an adhesive to at least part of the inner surface of said protective shell and/or to at least part of the outer surface of at least a leading portion of said outer surface of said wind turbine blade;

vii) fitting the inner surface of said protective shell onto at least a leading portion of the outer surface of said wind turbine blade;

viii) fitting the inner surface of said mounting shell onto said outer surface of said protective shell;

ix) applying a force to said mounting shell, and thereby also to said outer surface of said protective shell; wherein said force comprises a force component in a cord direction from the leading surface to the trailing surface of said wind turbine blade; wherein said force additionally comprises a force component in a direction perpendicular to the cord direction and perpendicular to the lengthwise direction of said wind turbine blade; thereby pressing said mounting shell and said protective shell against the outer surface of the wind turbine blade;

x) allowing said adhesive applied in step vi) to cure, and subsequently removing said mounting shell from said wind turbine blade and from said protective shell.

In a second aspect the present invention relates to a method for reducing the frequency and/or duration of non-operative time of a wind turbine, wherein said method involves providing said wind turbine with wind turbine blades which have been reinforced according to the method of the first aspect of the present invention.

In a third aspect the present invention relates to a kit of parts comprising a protective shell and a mounting shell; wherein said protective shell is being prepared according to step i), ii) and iii) as set out in the first aspect of the present invention; and wherein said mounting shell is being prepared according to step i), iv) and v) as set out in the first aspect of the present invention.

In a fourth aspect the present invention relates to a protective shell per se, as defined in respect of the third aspect of the present invention.

In a fifth aspect the present invention relates to a mounting shell per se, as defined in respect of the third aspect of the present invention.

The present invention in its various aspects provides for improving the structural integrity of an ordinary wind turbine blade by applying a protective cover according to the invention. The protective cover may be applied to new, unused blades which have never been put into operation, or may be applied to used blades which have already been put into operation.

The method of the invention even allows for applying a protective cover on wind turbine blades which suffers from surface defects at a leading portion du to erosion of composite material which in turn has been caused by impact of the blade with various types of debris in the air, even without regenerating the surface of the wind turbine blade at the sites of such defects.

The present invention also makes it possible for a wind turbine blade manufacturer or repair shop to provide to wind turbine operators a kit of parts comprising a protective shell and a corresponding mounting shell for the purpose of reinforcing wind turbine blades already in operation, thereby making it possible for wind turbine operators to obtain a reduced frequency and/or duration of non-operative time of a wind turbine.

Using the present invention in its various aspects it is possible in a very simple way to securely fix a protective shell to a leading part of a wind turbine blade.

Additionally, using a mounting shell and application of force in the curing step of the adhesive applied between the protective shell and the outer surface of the wind turbine blade ensures that protective shell will be fitted in an improved way providing better aerodynamic properties of the resulting wind turbine blade.

Moreover, it can be assured that no air pockets remain between the protective shell added and the outer surface of the wind turbine blade, thereby avoiding risk of explosive disintegration of the blade in case the blade encounters lightning strikes.

Finally, any surface defects on the wind turbine blade at the area of mounting the protective shell can simply be covered by the protective shell itself without the necessity of prior repair of such defects.

These advantages are achieved simply by adding a sufficient amount of adhesive between the protective shell and the outer surface of the wind turbine blade, and by providing an adequate force to the mounting shell and thus also the protective shell in the curing stage of the adhesive. Any excess amount of adhesive will simply fill out any such surface defects on the outer surface of the blade.

DETAILED DESCRIPTION OF THE INVENTION

In a first aspect the present invention relates to a method for reinforcing a part of the outer surface of a wind turbine blade, said method comprises the steps:

i) providing a blade plug having an outer surface resembling the topography of the outer surface of at least a leading portion of at least part of the length of a wind turbine blade;

ii) casting a mold of part of the blade plug obtained in step i) in such a way that the topography of an inner surface of said mold corresponds to the topography of part of an outer surface of said blade plug provided in step i);

iii) from the mold obtained in step ii), preparing a protective shell by making a casting of the inner surface of said mold; said protective shell is comprising an inner surface and an outer surface, said protective shell is being made from one or more predetermined materials;

iv) starting from the topography of the surface of the wind turbine blade; or starting from a blade plug as obtained in step i) preparing an enlarged plug; said enlarged plug thereby comprising an outer surface resembling the topography of the outer surface of at least a leading part of said wind turbine blade; said outer surface of said enlarged plug is having larger dimensions than said outer surface of said blade plug;

v) from the enlarged plug obtained in step iv), casting a mounting shell having an inner surface and an outer surface, in such a way that the topography of at least part of an inner surface of said mounting shell corresponds to the topography of part of an outer surface of said enlarged plug;

vi) applying an adhesive to at least part of the inner surface of said protective shell and/or to at least part of the outer surface of at least a leading portion of said outer surface of said wind turbine blade;

vii) fitting the inner surface of said protective shell onto at least a leading portion of the outer surface of said wind turbine blade;

viii) fitting the inner surface of said mounting shell onto said outer surface of said protective shell;

ix) applying a force to said mounting shell, and thereby also to said outer surface of said protective shell; wherein said force comprises a force component in a cord direction from the leading surface to the trailing surface of said wind turbine blade; wherein said force additionally comprises a force component in a direction perpendicular to the cord direction and perpendicular to the lengthwise direction of said wind turbine blade; thereby pressing said mounting shell and said protective shell against the outer surface of the wind turbine blade;

x) allowing said adhesive applied in step vi) to cure, and subsequently removing said mounting shell from said wind turbine blade and from said protective shell.

By providing a protective shell according to the method of the first aspect of the present invention it is assured that the topography of the inner surface of the protective shell fits the outer surface at a leading part of the wind turbine onto which the protective shell is to me mounted. By providing a mounting shell according to the method of the first aspect of the present invention it is assured that the inner surface of said mounting shell fits the outer surface of said protective shell. Hereby is assured that the protective shell can be fitted onto the outer surface at a leading part of the wind turbine in an improved way in that the mounting shell allows applying pressure to the whole inner surface of the protective shell upon allowing the applied adhesive to cure, such as by strapping together the wind turbine blade, the protective shell and the mounting shell.

In one embodiment of the method according to the first aspect of the present invention said wind turbine blade is a new and unused wind turbine blade; or said wind turbine blade is a used wind turbine blade, the surface of which has been refurbished or the surface of which has not been refurbished.

The method according to the first aspect of the present invention is advantageous in that it allows reinforcing a wind turbine blade irrespective of whether that wind turbine is new or used and irrespective of whether a used wind turbine blade has been refurbished, such as by repairing surface defects prior to applying the protective shell, or not.

In one embodiment of the method according to the first aspect of the present invention said outer surface of said blade plug represents an up-scaled surface of the outer surface of said wind turbine blade.

In one embodiment of the method according to the first aspect of the present invention said blade plug is being up-scaled in the sense that in respect of a portion of the outer surface of said wind turbine blade each point of said outer surface is being raised a certain distance in a direction perpendicular to a tangential plane of said point, said distance optionally being 0.5-5 mm, such as 1.0-4.5 mm, such as 1.5-4.0 mm, e.g. 2.0-3.5 mm, such as 2.5-3.0 mm.

By providing the blade plug with an outer surface which represents an up-scaled surface of the outer surface of said wind turbine blade onto which the protective shell is to be mounted, it can be assured that the inner surface of said protective shell fits the topography of a leading portion of an outer surface of said wind turbine blade.

In one embodiment of the method according to the first aspect of the present invention said blade plug provided in step i) is a copy of at least part of the wind turbine blade in respect of which the reinforcement is to be performed, and wherein said copy comprises a foamed material, such as foamed polystyrene or foamed polyurethane; optionally provided with a number of rigid ribs arranged essentially parallel to each other along the lengthwise direction of said blade plug, wherein said blade plug optionally is being provided with an outer layer of glass fiber reinforced polyester and optionally covered by one or more layers of lacquer.

In one embodiment of the method according to the first aspect of the present invention said blade plug provided in step i) has been made from measurements performed on said wind turbine blade or wherein said blade plug has been made from specification data of said wind turbine blade, wherein said blade plug optionally is being prepared by a process involving CNC milling.

These ways of manufacturing the blade plug are easy, fast and cost efficient.

In one embodiment of the method according to the first aspect of the present invention said mold prepared in step ii) is made from a composite material, such as a combination of a fibrous material and a hardened resin.

In one embodiment of the method according to the first aspect of the present invention said fibrous material independently is being selected from the group comprising: glass fibers, aramid fibers, carbon fibers; and/or wherein said resin independently is being selected form the group comprising polyester, epoxy, polyvinyl ester.

These materials have proven to be excellent for the intended purpose.

In one embodiment of the method according to the first aspect of the present invention said protective shell prepared in step iii) is made from a composite material, such as a combination of a fibrous material and a hardened resin.

In one embodiment of the method according to the first aspect of the present invention said fibrous material independently is being selected from the group comprising: glass fibers, aramid fibers, carbon fibers; and/or wherein said resin independently is being selected form the group comprising polyester, epoxy, polyvinyl ester.

These materials have proven to be excellent for the intended purpose.

In one embodiment of the method according to the first aspect of the present invention said the outer surface of said protective shell fitted in step vii) comprises a hardened resin free of any fibrous material.

Hereby is assured excellent aerodynamic properties of the resulting wind turbine blade.

In one embodiment of the method according to the first aspect of the present invention said protective shell prepared in step iii) is having an extension in a lengthwise direction corresponding to the extension, in a lengthwise direction, of the wind turbine blade from which blade plug is prepared; or wherein said the protective shell prepared in step iii) is having an extension in a lengthwise direction corresponding to 10% or more, such as 20% or more, e.g. 40% or more, such as 50% or more of the extension, in a lengthwise direction, of the wind turbine blade from which blade plug is prepared, as measured from the tip end of said wind turbine blade.

As the highest angular velocities of a wind turbine blade is being encountered at the tip end, these lengthwise dimensions of the protective shell, when being mounted near the tip end, ensures adequate protection against impact from debris or rain or hail encountered by a wind turbine blade during operation.

In one embodiment of the method according to the first aspect of the present invention said protective shell prepared in step iii) is being prepared in oversize, compared to the desired final size, and wherein excessive material of said protective shell (8), extending in a cord direction, subsequently is being trimmed in order to remove said excess material.

Hereby a smooth transition between the protective shell and the surface of the wind turbine blade onto which is being mounted may be assured.

In one embodiment of the method according to the first aspect of the present invention said protective shell is having an extension in its lengthwise direction of 1-100 m, such as 2-95 m, for example 5-90 m, such as 10-85 m, e.g. 15-80 m, such as 20-75 m, e.g. 25-70 m, such as 30-65 m, e.g. 35-60 m, such as 40-55 m or 45-50 m.

These lengths of the protective shell assure adequate and sufficient protection against impact from debris or rain or hail or snow encountered by a wind turbine blade during operation.

In one embodiment of the method according to the first aspect of the present invention said protective shell is having a thickness, as measured in a direction perpendicular to its inner or outer surface, in the range of 350 µm or more, such as 400 µm or more, e.g. 450 µm or more, such as 500 µm or more, e.g. 550 µm or more, such as 600 µm or more or 650 µm or more.

In one embodiment of the method according to the first aspect of the present invention said enlarged plug prepared in step iv) is prepared by adding an outer material to at least part of the outer surface of said blade plug.

In one embodiment of the method according to the first aspect of the present invention said enlarged plug prepared in step iv) is prepared by applying a sheet like outer material to at least part of the outer surface of said blade plug; or by applying a filler and optionally covering with a liner, such as a Teflon liner.

In one embodiment of this embodiment said sheet type outer material is applied to an outer surface of said blade plug by gluing.

In one embodiment of this embodiment said outer material is having a thickness corresponding to the thickness of said protective shell.

In one embodiment of the method according to the first aspect of the present invention said blade plug provided in step i) and step iv) is the same blade plug or are different blade plugs.

The blade plug used for preparing the protective shell may be the same blade plug as used for preparing the protective shell, or it may be a different blade plug, depending on the desired mode of preparation.

In one embodiment of the method according to the first aspect of the present invention said mounting shell prepared in step v) is made from a composite material, such as a combination of a fibrous material and a hardened resin.

In one embodiment of the method according to the first aspect of the present invention said fibrous material independently is being selected from the group comprising: glass fibers, aramid fibers, carbon fibers; and/or wherein said resin independently is being selected form the group comprising polyester, epoxy, polyvinyl ester.

These materials have proven to be excellent for the intended purpose.

In one embodiment of the method according to the first aspect of the present invention said mounting shell prepared in step v) is having an extension in the lengthwise direction corresponding to the extension in a lengthwise direction of the protective shell prepared in step iii).

In one embodiment of the method according to the first aspect of the present invention said mounting shell prepared in step v), at an outer surface thereof, is provided with one or more reinforcing structures for improving rigidity and structural integrity of said mounting shell; and/or for controlling the magnitudes of forces at various areas, applied to the underlying protective shell in step ix).

The presence of such reinforcing structures provides for improved control upon applying pressure in the curing step of the method and also provides for adequate rigidity of the mounting shell.

In one embodiment of the method according to the first aspect of the present invention said mounting shell is having an extension in its lengthwise direction of 1-100 m, such as 2-95 m, for example 5-90 m, such as 10-85 m, e.g. 15-80 m, such as 20-75 m, e.g. 25-70 m, such as 30-65 m, e.g. 35-60 m, such as 40-55 m or 45-50 m.

These lengths of the mounting shell enable mounting of a protective shell of the same length and thereby provide adequate and sufficient protection against impact from debris or rain or hail or snow encountered by a wind turbine blade during operation.

In one embodiment of the method according to the first aspect of the present invention the dimensions of the outer surface of said blade plug, and the dimensions of the outer surface of said enlarged plug, and the thickness of said protective shell are adapted to each other in such a way that the inner surface of said protective shell fits onto at least a part of said outer surface of said wind turbine blade, and in such a way that said inner surface of said mounting shell fits onto the outer surface of said protective shell.

Hereby optimum quality of the mounted protective shell on the wind turbine blade is assured.

In one embodiment of the method according to the first aspect of the present invention the adhesive applied in step vi) is of a type selected from the group comprising: polyurethane adhesive, epoxy or acrylates.

These types of adhesives have proven to provide excellent adherence results.

In one embodiment of the method according to the first aspect of the present invention one or more release liners are positioned between said protective shell and said mounting shell in step viii). Hereby is avoided that said mounting shell is being glued to said wind turbine blade.

In one embodiment of the method according to the first aspect of the present invention said protective shell in step vii) is fitted as one and only one coherent entity; and wherein in step viii) said mounting shell is fitted as one coherent entity or as two or more separate entities.

Provided the protective shell as one and only one coherent shell provides for optimum adherence and protection of the wind turbine blade.

In one embodiment of the method according to the first aspect of the present invention said mounting shell is fitted as two or more separate entities, wherein these entities are being manufactured from said one and only one coherent entity by, at predetermined longitudinal positions of said mounting shell, applying a release liner at an outer surface thereof and casting a fiber reinforced polymer, such as glass fiber reinforced polyester, over said release liner and a distance from one rim of said liner, thereby forming an overlap section of fiber reinforced polymer; and subsequently cutting through said mounting shell at the position of said one rim of said liner without cutting through said overlap section of fiber reinforced polymer.

Mounting the mounting shell as two or more separate entities allows for easier handling of the mounting shell during mounting of the protective shell.

In one embodiment of the method according to the first aspect of the present invention step vii), viii) and ix) and optionally also step vi) is being performed on ground, such as in a manufacturing or repair facility; or on-site on a wind turbine blade which is mounted in a hub of a wind turbine rotor, such as on an on-shore or on an off-shore wind turbine; or on ground at the site of said wind turbine.

Accordingly the method for reinforcing a part of the outer surface of a wind turbine blade does not require much restriction as to the location of the mounting of the protective shell.

In one embodiment of the method according to the first aspect of the present invention step ix) is performed by arranging one or more straps around said wind turbine blade, said protective shell and said mounting shell and subsequently tightening said one or more straps for a predetermined duration of time.

Hereby optimum surface contact between the outer surface of the wind turbine and the inner surface of the protective shell is assured and hence optimum adherence to the surface of the blade is assured.

In one embodiment of the method according to the first aspect of the present invention said straps independently are being are arranged along the lengthwise direction of said wind turbine blade, at a mutual distance of 0.1-3.0 meter, such as 0.2-2.9 meter, for example 0.3-2.8 meter, for example 0.4-2.7 meter, such as 0.5-2.6 meter, such as 0.6-2.5 meter, for example 0.7-2.4 meter, for example 0.8-2.3 meter, e.g. 0.9-2.2 meter, such as 1.0-2.1 meter, e.g. 1.1-2.0 m, such as 1.2-1.9 m, for example 1.3-1.8 m, such as 1.4-1.7 m or 1.5-1.6 m.

Hereby optimum adherence of the protective shell to the surface of the blade is assured.

In one embodiment of the method according to the first aspect of the present invention step ix) is performed by arranging an uninflated inflatable bag between said protective shell and said mounting shell and wherein said force applied to said outer surface of said protective shell is provided by inflating said inflatable bag.

Hereby better controlling of the applied forces to the mounting shell can be obtained.

In one embodiment of the method according to the first aspect of the present invention step x) is performed by providing heating means, such as one or more heating mantles near said mounting shell, such as at the outer surface of said mounting shell.

Hereby enhanced curing rate of said adhesive may be attained.

In one embodiment of the method according to the first aspect of the present invention said outer surface of at least a leading portion of said wind turbine blade, prior to step vi), is cleaned, abraded and/or subjected to other types of treatment for improving adherence of said adhesive and hence said protective shell.

Hereby enhanced adherence of the protective shell may be attained.

In one embodiment of the method according to the first aspect of the present invention the rims of said protective shell are being tapered from the outer surface thereof to the inner surface thereof.

Hereby, a smooth transition area between said wind turbine blade and said protective shell is provided.

In a second aspect the present invention relates to a method for reducing the frequency and/or duration of non-operative time of a wind turbine, wherein said method involves providing said wind turbine with wind turbine blades which have been reinforced according to the method of the first aspect of the present invention.

In a third aspect the present invention relates to a kit of parts comprising a protective shell and a mounting shell; wherein said protective shell is being prepared according to step i), ii) and iii) as set out in the first aspect of the present invention; and wherein said mounting shell is being prepared according to step i), iv) and v) as set out in the first aspect of the present invention.

In one embodiment of the kit of parts according to the third aspect of the present invention said kit of parts further comprising an inflatable airbag.

Hereby better controlling of the applied forces to the mounting shell can be obtained upon using the kit of parts.

In one embodiment of the kit of parts according to the third aspect of the present invention said protective shell is present as a reel defining a spiral.

Hereby is achieved that even very long protective shells having an extension in a lengthwise direction of several dozens of meters may be easily stored and transported.

In a fourth aspect the present invention relates to a protective shell per se, as defined in respect of the third aspect of the present invention.

In a fifth aspect the present invention relates to a mounting shell per se, as defined in respect of the third aspect of the present invention.

Figure 1:
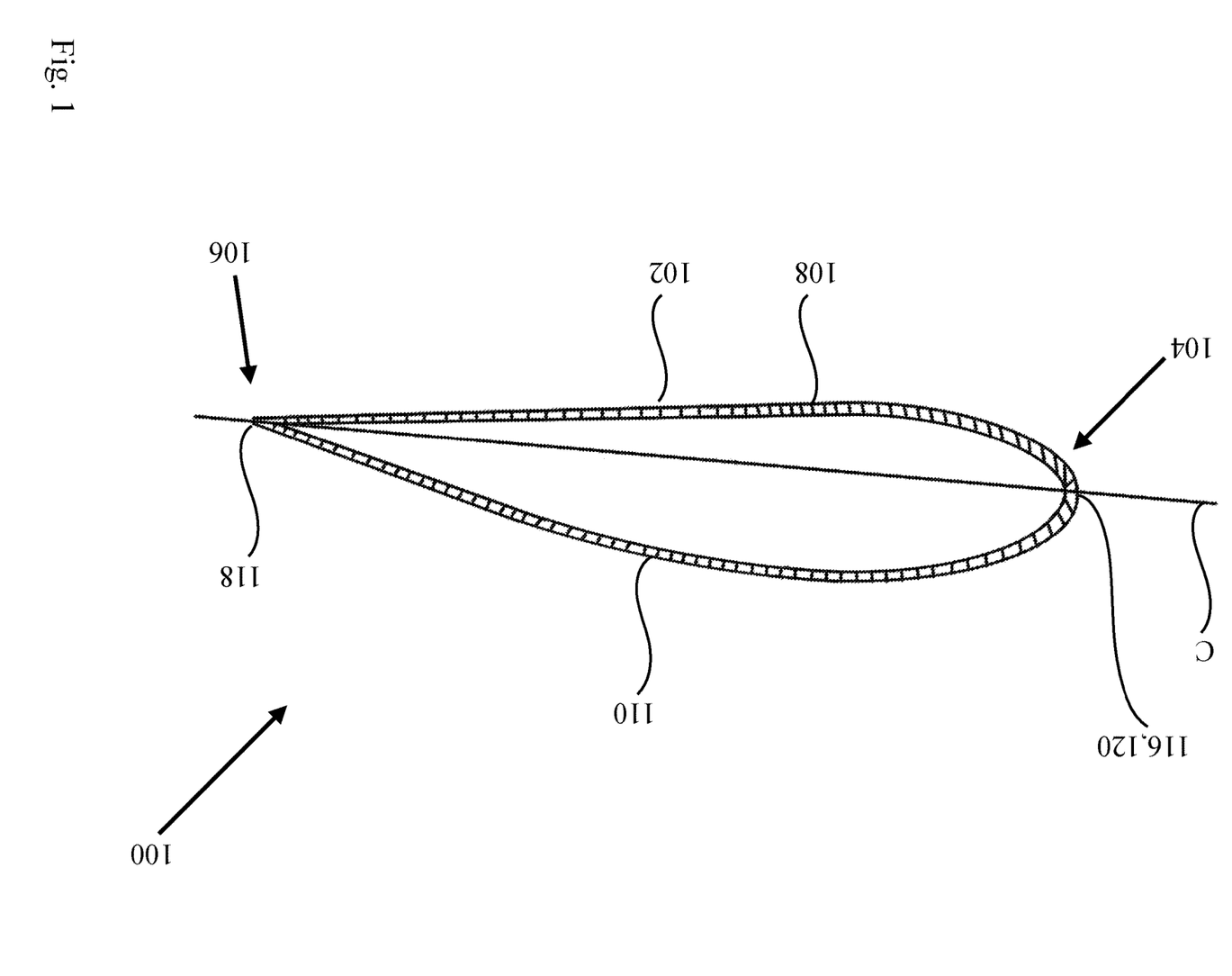
FIG. 1 is a cross sectional view of a wind turbine blade.

Referring now to the figures for better illustrating the present invention in its various aspects, FIG. 1 illustrates a wind turbine blade is a cross-sectional view. FIG. 1 shows the wind turbine blade 100 having an outer surface 102 with a leading portion 104 and a trailing portion 106. The outer surface comprises a high pressure side 108 and a low pressure side 110.

Between the leading edge 116 and the trailing edge 118 of the blade 100 a cord line C is defined. Accordingly, the cord line intersects a front edge line 120 comprising points at the far leading positions of the leading portion of the wind turbine blade.

Figure 2:
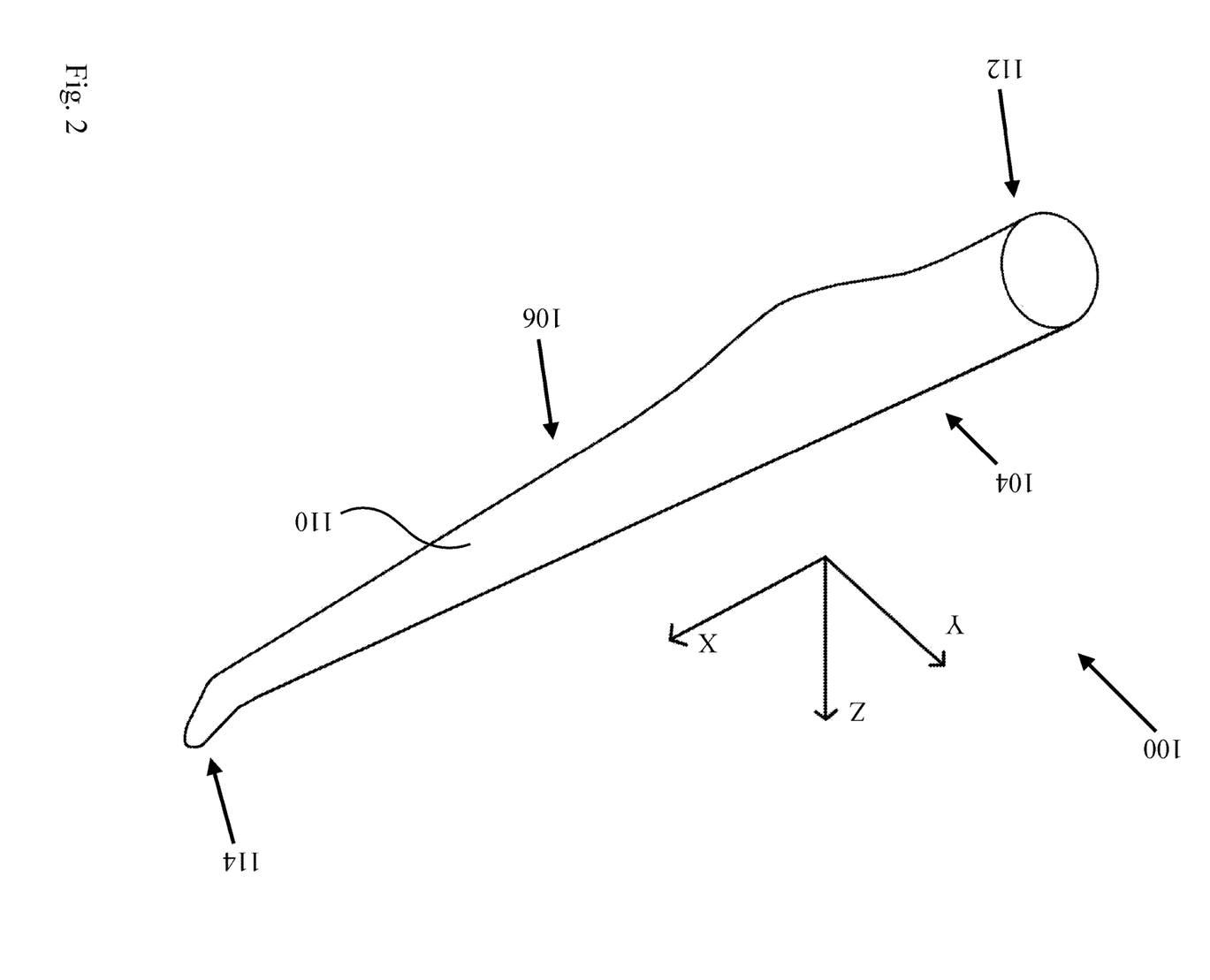
FIG. 2 is a perspective view of a wind turbine blade.

FIG. 2 is a perspective view of a wind turbine blade 100. FIG. 2 shows that the wind turbine blade comprises a root end 112 and a tip end 114. In FIG. 2 is also depicted that the lengthwise direction X of the wind turbine blade 100 is defined as a direction essentially extending between the root end 112 and the tip end 114. In analogy a width direction Y is the direction between the leading portion 104 and the trailing portion 106 of the wind turbine blade. The direction Y is perpendicular to the lengthwise direction X.

Perpendicular to the lengthwise direction X and the width direction Y is the height direction Z.

Figure 3:
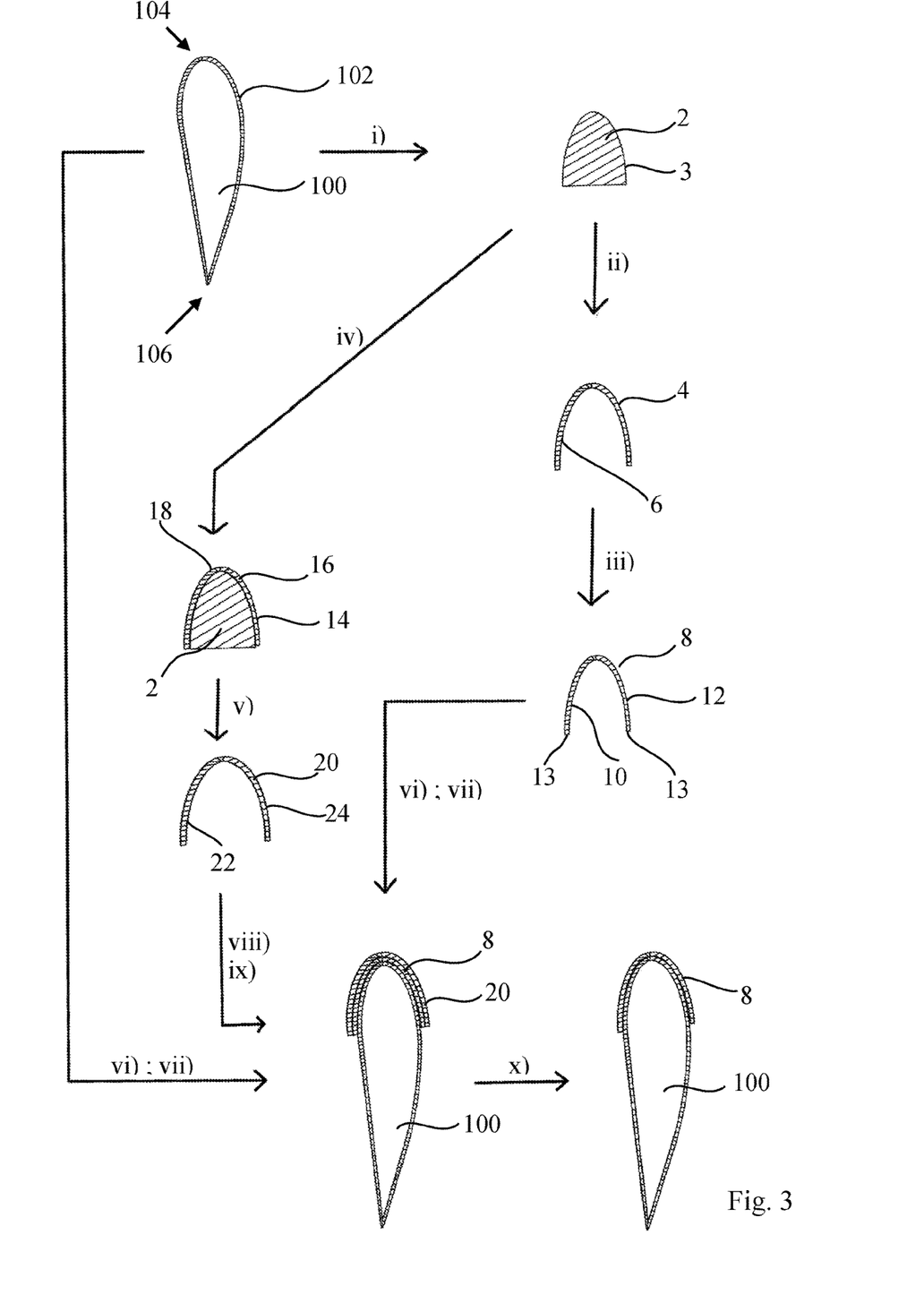
FIG. 3 is a diagram schematically illustrating the method according to the first aspect of the present invention.

FIG. 3 is a diagram schematically illustrating one embodiment of the method according to the first aspect of the present invention. Accordingly, FIG. 3 illustrates the various steps i), ii), iii), iv), v), vi), vii), viii), ix) and x) involved in the method of the first aspect of the present invention.

In FIG. 3 it seen that step i) of the method of the first aspect of the present invention relates to the provision of a blade plug 2. The blade plug to is made from information relating to the topography of the outer surface of a leading portion 104 of the wind turbine 100 which is to be reinforced.

As we are only interested in reinforcing a part of the leading portion 104 of the outer surface 102 of the wind turbine blade 100, the blade plug 2 provided in step i) of the method of the first aspect of the present invention only has an extension that resembles the leading portion 104 of the wind turbine blade 100.

The model of the wind turbine blade 100 providing the information relating to the topography of the outer surface 102 of the leading portion thereof may be the wind turbine blade 100 itself in respect of which the reinforcement is to be performed or it may be a wind turbine blade 100 similar to or of the same type as the wind turbine blade in respect of which the reinforcement is to be performed; or it may be a copy of at least part of the wind turbine blade 100 in respect of which the reinforcement is to be performed.

Such a copy of the wind turbine blade 100 or part thereof may be manufactured from a foamed material, such as foamed polystyrene or foamed polyurethane which may be provided with a number of rigid ribs arranged essentially parallel to each other along a lengthwise direction of said copy of said wind turbine blade. Such copy of the wind turbine blade may be provided with a coating of glass fiber reinforced polyester and one or more layers of lacquer.

The blade plug 2 provided in step i) may also be made from specification data of the wind turbine blade 100, wherein the blade plug 2 may be prepared by CNC milling. The outer surface 3 of the blade plug 2 resembles the outer surface 102 of the leading portion 104 of the wind turbine blade 100 which is to be reinforced. However, the outer surface 3 represents an up-scaled surface of the outer surface of the wind turbine blade.

Thereby it is ensured that the outer surface 3 of the blade plug represents the topography of at least a leading portion 104 of at least part of the length of the wind turbine blade 100.

In step ii) of the method of the first aspect of the present invention a mold 4 is being casted from the blade plug 2 provided in step i).

The mold 4 is typically being prepared by covering the outer surface 3 of the blade plug 2 with one or more layers of a composite material. Such a composite material may be a combination of a fibrous material and a hardened resin.

As examples of fibrous material can be mentioned glass fibers, aramid fibers, carbon fibers;

Examples of resins may be polyester, epoxy, polyvinyl ester, polyurethane, MDI, PUR, and HDI.

When the composite material has been applied to the outer surface 3 of the blade plug 2 and has been allowed to cure, the mold 4 is removed from the blade plug 2.

As we have ensured that the outer surface 3 of the blade plug represents the topography of the outer surface 102 of a leading portion 104 of the wind turbine blade 100, also the inner surface 6 of the mold 4 is having a topography that represents the outer surface 102 of a leading portion 104 of the wind turbine blade 100; that is in a reversed sense. Accordingly, as the outer surface 3 of the blade plug is a positive representation of part of the outer surface 102 of a leading portion 104 of the wind turbine blade 100, the inner surface 6 of the mold 4 has become a negative representation of part of the outer surface 102 of a leading portion 104 of the wind turbine blade 100.

In step iii) of the method of the first aspect of the present invention a protective shell 8 is being casted from the mold 4 provided in step ii).

The protective shell 8 is typically being prepared by covering the inner surface 6 of the mold 4 with one or more layers of a composite material. Such a composite material may be a combination of a fibrous material and a hardened resin.

As examples of fibrous material can be mentioned glass fibers, aramid fibers, carbon fibers.

Examples of resins may be polyester, epoxy, and polyvinyl ester. When the composite material has been applied to the inner surface 6 of the mold 4 and has been allowed to cure, the protective shell 8 is removed from the mold 4.

The protective shell 8 is now ready for being fixed to a leading portion 104 of the outer surface 102 of the wind turbine blade 100.

This fixing of the protective shell 8 to the wind turbine 100 is being performed in step vi) and vi)) of the method of the first aspect of the present invention as illustrated in FIG. 3.

However, before the protective shell 8 can be fixed to the wind turbine blade, a mounting shall must first be prepared, This is illustrated in FIG. 3 which shows the step iv).

In step iv) an enlarged plug 14 is being prepared. The enlarged plug is made from the blade plug 2 by adding an outer material 16 to at least part of the outer surface 3 of the blade plug 2. Thereby the enlarged plug 14 will comprise an outer surface 18 which exhibits an enlarged topography compared to the topography of the surface 3 of the blade plug 2.

The outer material 16 applied to the outer surface 3 of the blade plug 2 may be a sheet like material which may be applied to the outer surface 3 of said blade plug 2 by gluing. In step iv) of the first aspect of the present invention may be the same blade plug 2 provided in step i), or alternatively, these blade plugs 2 may be different blade plugs.

In step v) a mounting shell 20 is prepared from the enlarged plug 14. The mounting shell 20 is typically prepared by covering the outer surface 18 of the enlarged plug 14 with one or more layers of a composite material. Such a composite material may be a combination of a fibrous material and a hardened resin.

As examples of fibrous material can be mentioned glass fibers, aramid fibers, carbon fibers.

Examples of resins may be polyester, epoxy, polyvinyl ester. Once the composite material has been applied to the outer surface 18 of the enlarged plug 14 and has been allowed to cure, the mounting shell 20 is removed from the enlarged plug 14.

Now, when the protective shell 8 and the mounting shell 20 have been provided, the protective shell 8 can be fixed to wind turbine blade 10.

This is illustrated in FIG. 3 in step vi), vii), viii) and ix).

In step vi) an adhesive 26 is applied to at least part of the inner surface 10 of said protective shell 8 and/or to at least part of the outer surface 102 of at least a leading portion of said wind turbine blade 100. The adhesive 26 is not visible in FIG. 3.

Subsequently, in step vii) the inner surface 10 of said protective shell 8 is being fitted onto at least a leading portion 104 of the outer surface 102 of the wind turbine blade 100.

When the protective shell has been fitted onto the outer surface 102 of the wind turbine blade 100, the inner surface 22 of said mounting shell 20 is in step viii) fitted onto the outer surface 12 of the protective shell 8.

Subsequently, in step ix) a force is applying to the mounting shell 20, and thereby also to the outer surface 12 of the protective shell 8 in order to make sure that a tight fixture is being provided between the protective shell 8 and the outer surface 102 of the wind turbine blade 100.

The force applied comprises a force component in a cord direction C from the leading portion of the outer surface 102 to the trailing portion 106 of the outer surface 102 of the wind turbine blade 100.

Additionally, the force applied comprises a force component in a direction Z perpendicular to the cord direction C and perpendicular to the lengthwise direction X of said wind turbine blade 100.

Hereby it is ensured that the mounting shell 20 and the protective shell 8 are being pressed against the outer surface 102 of the wind turbine blade 100.

Finally, in step x) the adhesive 26 applied in step vi) is allowed to cure, and subsequently the mounting shell 20 is removed from the wind turbine blade 100 and from the protective shell 8.

Hereby a reinforced wind turbine blade has been provided.

Figure 4:
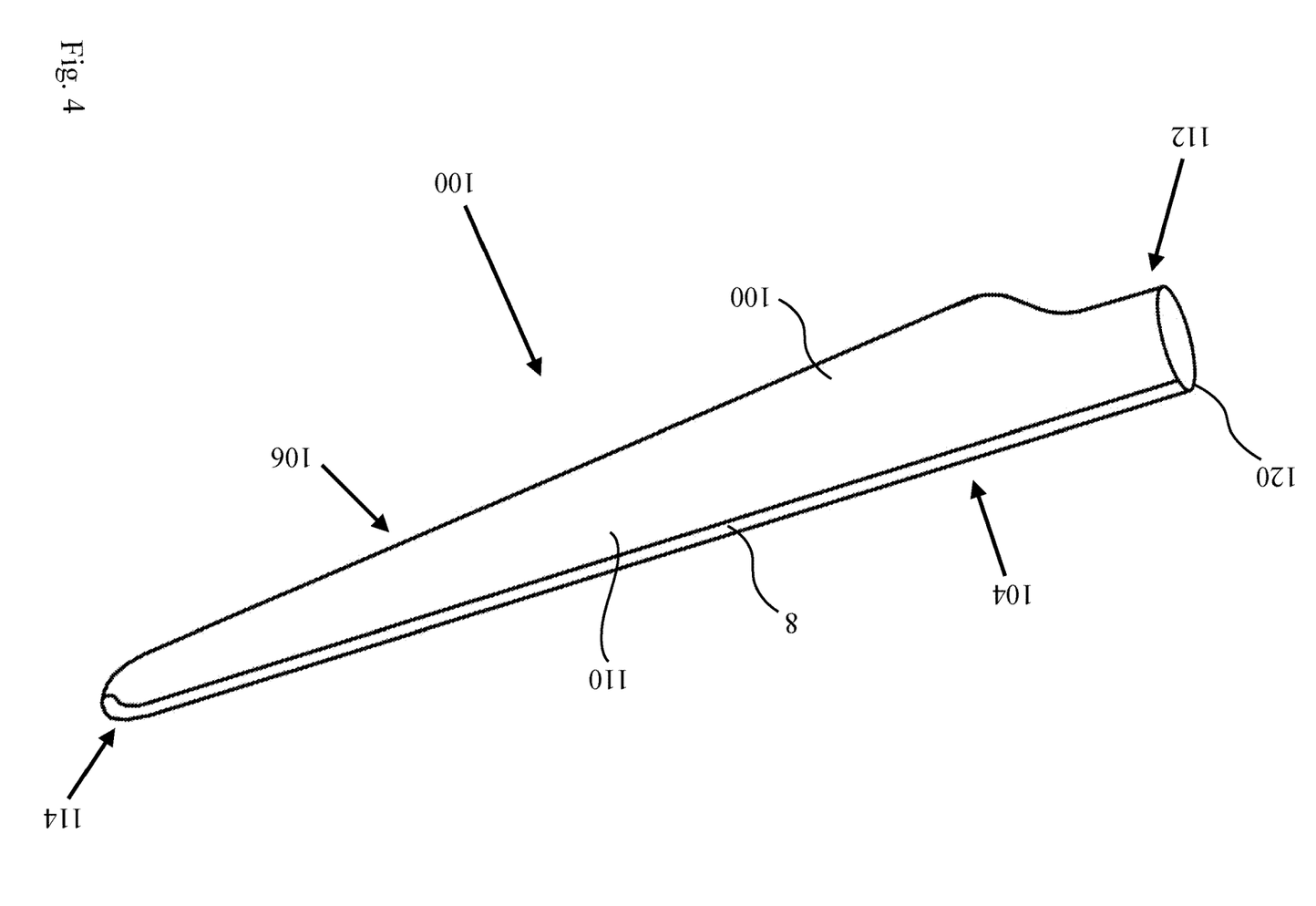
FIG. 4 is a perspective view of a wind turbine blade which at its leading portion has been provided with a reinforcing protective shell according to the method of the present invention.

This is illustrated in FIG. 4.

FIG. 4 shows the wind turbine blade 100 which at a leading portion 104 of the outer surface 102 has been provided with a protective shell 8 according to the method of the first aspect of the present invention.

The protective shell 8 extends on the low pressure side 110 of the outer surface 102 of the wind turbine from the front edge line 120 a distance towards the trailing portion 106 of the blade 100.

Likewise, the protective shell 8 also extends on the high pressure side 108 of the outer surface 102 of the wind turbine from the front edge line 120 a distance towards the trailing portion 106 of the blade 100 (not visible in FIG. 4).

Figure 5:
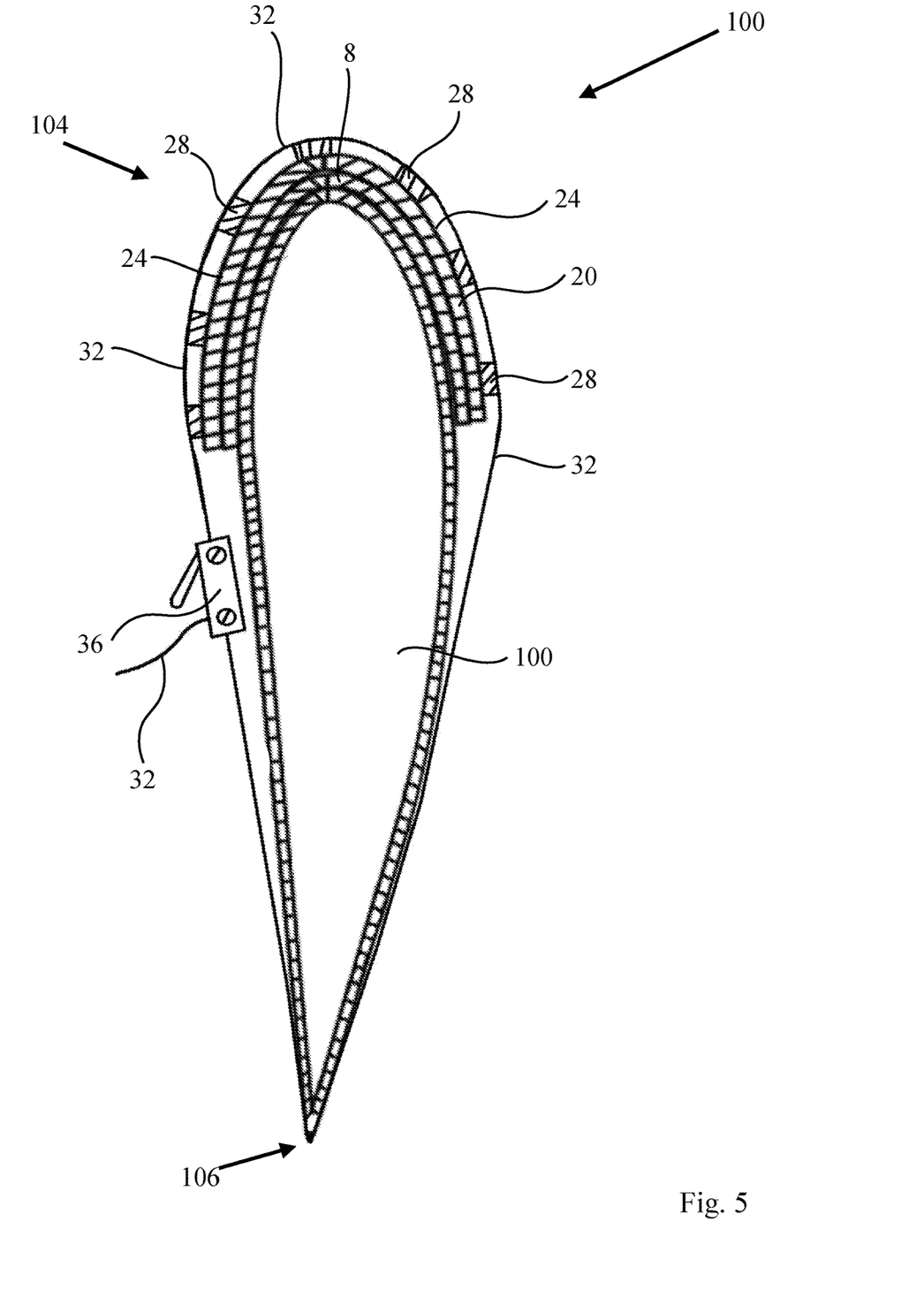
FIG. 5 is a cross-sectional view illustrating one embodiment of the step of fastening or fixing a protective shell 8 to the leading portion of a wind turbine blade.

FIG. 5 illustrates in a cross sectional view one embodiment of the step of fastening or fixing the protective shell 8 to the leading portion 104 of the outer surface 102 of the wind turbine blade.

FIG. 5 shows the wind turbine blade 100 which at its leading portion 104 of its outer surface 102 has been provided with a protective shell 8 which is glued onto the outer surface of the wind turbine blade 100 with an adhesive 26. The adhesive 26 is not visible in FIG. 5.

On top of the protective shell 8 a mounting shell 20 has been arranged. The mounting shell 20 has on its outer surface 24 been provided with a number of reinforcing structures 28 which may be wood beams arranged in a lengthwise direction X of the wind turbine blade.

A number of straps 32 have been arranged so as to surround the wind turbine blade 100, the protective shell 8 and the mounting shell 20 with its reinforcing structures 28.

By tightening the one or more straps 32 by means of the strap tensioner 36 for a predetermined duration of time a strong and durable fixture of the protective shell 8 onto the wind turbine is ensured.

Also, by experimenting with the positions, the mutual distances and the extensions above the outer surface 24 of the reinforcing structures 28 of the mounting shell 20, an optimum distribution of magnitudes and direction of forces forcing the protective shell onto the outer surface 102 of the wind turbine blade may be attained, thereby securing an optimum fixture of that protective shell.

Figure 6:
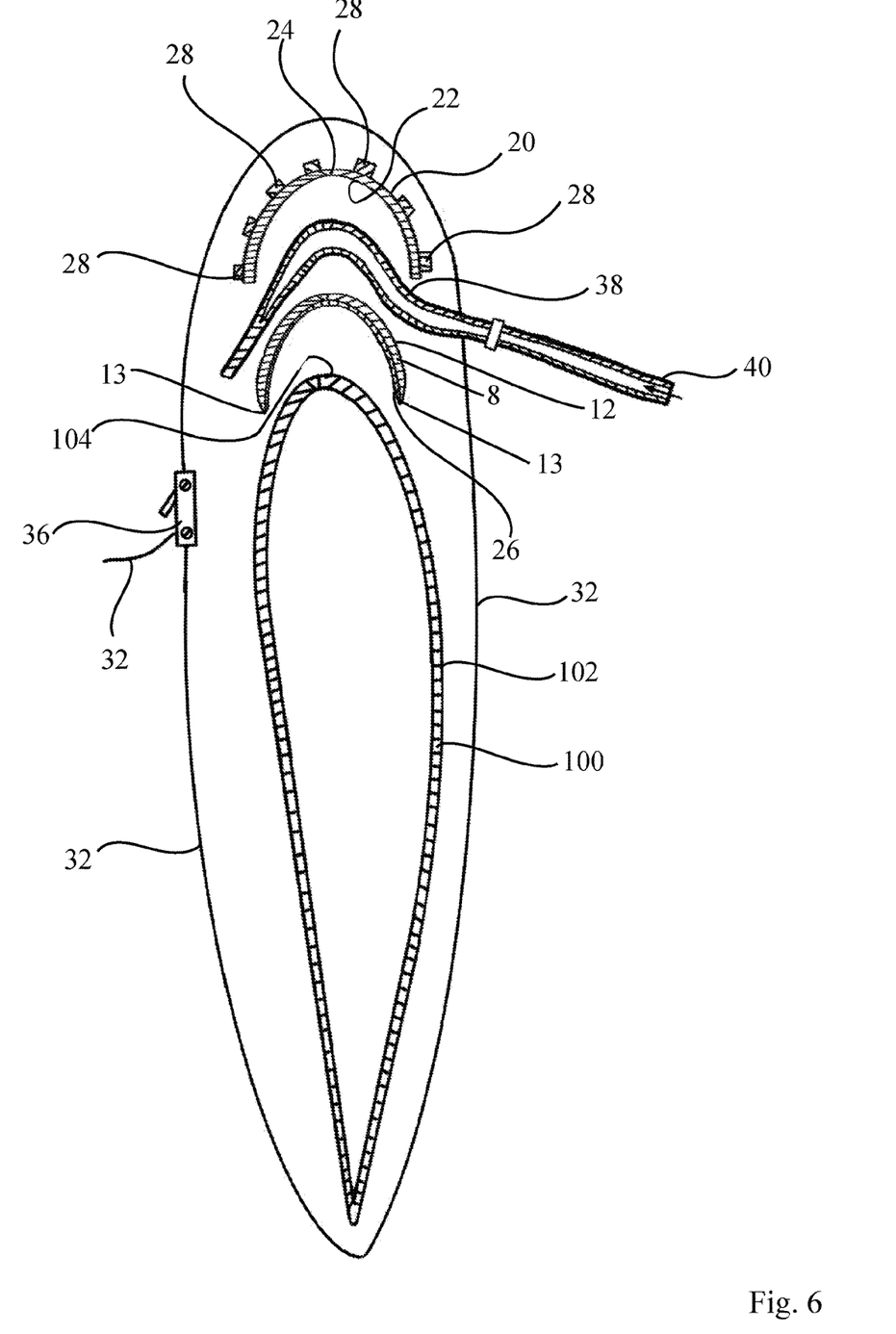
FIG. 6 is an explosive, partly cross-sectional view of the step of fastening or fixing a protective shell to the leading portion of a wind turbine blade.

FIG. 6 is an explosive, partly cross-sectional view of the step of fastening or fixing a protective shell to the leading portion of a wind turbine blade.

FIG. 6 shows the wind turbine blade 100 having an outer surface 102 and a leading portion 104.

Above the leading portion 104 of the blade 100 a protective shell 8 is arranged. The protective shell 8 is at its inner surface 10 provided with a layer of adhesive 26.

Above the protective shell 8 a mounting shell 20 has been arranged. The mounting shell 20 has on its outer surface 24 been provided with a number of reinforcing structures 28.

Between the protective shell 8 and the mounting shell 20 an inflatable air bag 38 is arranged. The air bag 38 is provided with a hose 40 for supplying air and hereby to inflate the airbag.

A strap 32 has been arranged so as to surround the wind turbine blade 100, the protective shell 8, the mounting shell 20 and the inflatable air bag 38.

The strap 32 and the inflatable air bag 38 together provide for applying forces to the protective shell 8 in order to ensure sufficient adherence of the protective shell to the surface 102 of the wind turbine blade at a leading portion 104 thereof.

FIG. 6 also shows that the rims 13 of the protective shell have been tapered in a direction from the outer surface thereof to the inner surface thereof.

It should be understood that the figures of the present patent application are included for illustration purposes only. Especially it is noted that no attempt has been made to make the figures true to scale.

It should be understood that all features and achievements discussed above and in the appended claims in relation to one aspect of the present invention and embodiments thereof apply equally well to the other aspects of the present invention and embodiments thereof.

LIST OF REFERENCE NUMERALS

2 Blade plug
3 Outer surface of blade plug
4 Mold
6 Inner surface of mold
8 Protective shell
10 Inner surface of protective shell
12 Outer surface of protective shell
13 Rim of protective shell
14 Enlarged plug
16 Outer material of enlarged plug
18 Outer surface of enlarged plug
20 Mounting shell
22 Inner surface of mounting shell
24 Outer surface of mounting shell
26 Adhesive
28 Reinforcing structure at outer surface of mounting shell
30 Release liner
32 Strap
36 Strap tensioner
38 Inflatable air bag
40 Air hose of inflatable air bag
100 Wind turbine blade
102 Outer surface of wind turbine blade
104 Leading portion of wind turbine blade
106 Trailing portion of wind turbine blade
108 High pressure side of wind turbine blade
110 Low pressure side of wind turbine blade
112 Root end of wind turbine blade
114 Tip end of wind turbine blade
116 Leading edge of wind turbine blade
118 Trailing edge of wind turbine blade
120 Front edge line
C Cord direction of wind turbine blade
X Lengthwise direction of wind turbine blade
Y Width direction of wind turbine blade
Z Height direction of wind turbine blade

The invention claimed is:

1. A method for reinforcing a part of the outer surface (102) of a wind turbine blade (100), said method comprises the steps:
   i) providing a blade plug (2) having an outer surface (3) resembling the topography of the outer surface of at least a leading portion (104) of at least part of the length of a wind turbine blade (100);
   ii) casting a mold (4) of part of the blade plug (2) obtained in step i) in such a way that the topography of an inner surface (6) of said mold (4) corresponds to the topography of part of an outer surface (3) of said blade plug provided in step i);
   iii) from the mold (4) obtained in step ii), preparing a protective shell (8) by making a casting of the inner surface (6) of said mold; said protective shell is comprising an inner surface (10) and an outer surface (12), said protective shell is being made from one or more predetermined materials;
   iv) starting from the topography of the surface of the wind turbine blade (100); or starting from a blade plug (2) as obtained in step i) preparing an enlarged plug (14); said enlarged plug thereby comprising an outer surface (18) resembling the topography of the outer surface of at least a leading part (104) of said wind turbine blade (100); said outer surface (18) of said enlarged plug (14) is having larger dimensions than said outer surface (3) of said blade plug (2);
   v) from the enlarged plug (14) obtained in step iv), casting a mounting shell (20) having an inner surface (22) and an outer surface (24), in such a way that the topography of at least part of an inner surface (22) of said mounting shell (20) corresponds to the topography of part of an outer surface (18) of said enlarged plug (14);
   vi) applying an adhesive (26) to at least part of the inner surface (10) of said protective shell (8) and/or to at least part of the outer surface (102) of at least a leading portion of said outer surface (102) of said wind turbine blade (100);
   vii) fitting the inner surface (10) of said protective shell (8) onto at least a leading portion (104) of the outer surface (102) of said wind turbine blade (100);
   viii) fitting the inner surface (22) of said mounting shell (20) onto said outer surface (12) of said protective shell (8);
   ix) applying a force to said mounting shell (20), and thereby also to said outer surface (12) of said protective shell (8); wherein said force comprises a force component in a cord direction (C) from the leading surface to the trailing surface of said wind turbine blade (100); wherein said force additionally comprises a force component in a direction (Z) perpendicular to the cord direction (C) and perpendicular to the lengthwise direction (X) of said wind turbine blade (100); thereby pressing said mounting shell (20) and said protective shell (8) against the outer surface (102) of the wind turbine blade (100);
   x) allowing said adhesive (26) applied in step vi) to cure, and subsequently removing said mounting shell (20) from said wind turbine blade (100) and from said protective shell (8).

2. A method according to claim 1, wherein said enlarged plug (14) prepared in step iv) is prepared by adding an outer material (16) to at least part of the outer surface (3) of said blade plug (2).

3. A method according to claim 2, wherein said enlarged plug (14) prepared in step iv) is prepared by applying a sheet like outer material (16) to at least part of the outer surface (3) of said blade plug (2); or by applying a filler and optionally covering with a liner.

4. A method according to claim 3, wherein said liner is a Teflon liner.

5. A method according to claim 2, wherein said outer material (16) is having a thickness corresponding to the thickness of said protective shell (8).

6. A method according to claim 1, wherein the blade plug (2) provided in step i) and step iv) is the same blade plug or are different blade plugs.

7. A method according to claim 1, wherein said mounting shell (20) prepared in step v) is made from a composite material.

8. A method according to claim 7, wherein said composite material is a combination of a fibrous material and a hardened resin.

9. A method according to claim 1, wherein said mounting shell (20) prepared in step v) is having an extension in the lengthwise direction (X) corresponding to the extension in a lengthwise direction of the protective shell prepared in step iii).

10. A method according to claim 1, wherein said mounting shell (20) prepared in step v), at an outer surface (24) thereof, is provided with one or more reinforcing structures (28) for improving rigidity and structural integrity of said mounting shell; and/or for controlling the magnitudes of forces at various areas, applied to the underlying protective shell (8) in step ix).

11. A method according to claim 1, wherein the dimensions of the outer surface (3) of said blade plug (2), and the dimensions of the outer surface (18) of said enlarged plug, and the thickness of said protective shell (8) are adapted to each other in such a way that the inner surface (10) of said protective shell (8) fits onto at least a part of said outer surface (102) of said wind turbine blade (100), and in such a way that said inner surface (22) of said mounting shell (14) fits onto the outer surface (12) of said protective shell (8).

12. A method according to claim 1, wherein in step viii) one or more release liners (30) are positioned between said protective shell (8) and said mounting shell (20) in order to avoid gluing said mounting shell to said wind turbine blade.

13. A method according to claim 1, wherein in step vii) the protective shell (8) is fitted as one and only one coherent entity; and wherein in step viii) the mounting shell (20) is fitted as one coherent entity or as two or more separate entities.

14. A method according to claim 13 wherein in step viii) the mounting shell (20) is fitted as two or more separate entities, wherein these entities are being manufactured from said one and only one coherent entity by, at predetermined longitudinal positions of said mounting shell (20), applying a release liner at an outer surface thereof and casting a fiber reinforced polymer over said release liner and a distance from one rim of said liner, thereby forming an overlap section of fiber reinforced polymer; and subsequently cutting through said mounting shell (20) at the position of said one rim of said liner without cutting through said overlap section of fiber reinforced polymer.

15. A method according to claim 14, wherein said fiber reinforced polymer is glass fiber reinforced polyester.

16. A method according to claim 1, wherein step vii), viii) and ix) and optionally also step vi) is being performed on ground in a manufacturing or repair facility; or on-site on a wind turbine blade (100) which is mounted in a hub of a wind turbine rotor; or on ground at the site of said wind turbine.

17. A method according to claim 1, wherein step ix) is performed by arranging one or more straps (32) around said wind turbine blade (100), said protective shell (8) and said mounting shell (20) and subsequently tightening said one or more straps (32) for a predetermined duration of time.

18. A method according to claim 1, wherein step ix) is performed by arranging an uninflated inflatable bag (38) between said protective shell (8) and said mounting shell (20) and wherein said force applied to said outer surface (12) of said protective shell (8) is provided by inflating said inflatable bag (38).

19. A method according to claim 1, wherein step x) is performed by providing heating means near said mounting shell for enhancing the curing rate of said adhesive (26).

20. A method according to claim 19, wherein said heating means comprises one or more heating mantles.

21. A method according to claim 19, wherein said heating means are at the outer surface of said mounting shell.

22. A method according to claim 1, wherein prior to step vi) said outer surface (102) of at least a leading portion (104) of said wind turbine blade (100) is cleaned, abraded and/or subjected to other types of treatment for improving adherence of said adhesive and hence said protective shell (8).

23. A method according to claim 1 wherein the rims (13) of said protective shell (8) are being tapered from the outer surface (12) thereof to the inner surface (10) thereof, thereby providing a smooth transition area on said wind turbine blade (100).

* * * * *